United States Patent [19]
Olshansky

[11] 4,006,962
[45] Feb. 8, 1977

[54] COMMUNICATION SYSTEM HAVING LOW DISPERSION GLASS OPTICAL WAVEGUIDE

[75] Inventor: Robert Olshansky, Addison, N.Y.

[73] Assignee: Corning Glass Works, Corning, N.Y.

[22] Filed: May 27, 1975

[21] Appl. No.: 581,281

[52] U.S. Cl. .................... 350/96 WG; 350/96 GN
[51] Int. Cl.² .......................................... G02B 5/14
[58] Field of Search ................ 350/96 GN, 96 WG

[56] References Cited

UNITED STATES PATENTS

| 3,785,718 | 1/1974 | Gloge .......................... | 350/96 GN |
| 3,823,997 | 7/1974 | Gloge et al. .................. | 350/96 GN |

OTHER PUBLICATIONS

"Multimode Theory of Tech. Core Fibers" by Gloge et al. Bell System Tech. Journal vol. 52, No. 9, Nov. 1973, pp. 1563-1578.

"A New Technique for the Preparation of Low-Loss and Guided-Index Optical Fibers" by Macchesney et al., Proceeding of IEEE Sept. 1974.

Bending Loss in Multimode Fibers with Graded Upgraded Ungraded Core Index by Gloge, Applied Optics vol. 11, No. 11, Nov. 1972.

Primary Examiner—John K. Corbin
Assistant Examiner—Stewart Levy
Attorney, Agent, or Firm—William J. Simmons, Jr.; Walter S. Zebrowski; Clarence R. Patty, Jr.

[57] ABSTRACT

An optical waveguide for use in an optical communication system employing a broad spectral source. Mode coupling is present in the propagation of optical signals in the waveguide, and the parameters of the waveguide are such that pulse dispersion produced by the finite spectral width of the source is minimized by utilizing the mode coupling to substantially cause cancellation of dispersion which is linear with respect to waveguide length and which is caused by the mode independent material dispersion and by the mode dependent waveguide dispersion.

4 Claims, 4 Drawing Figures

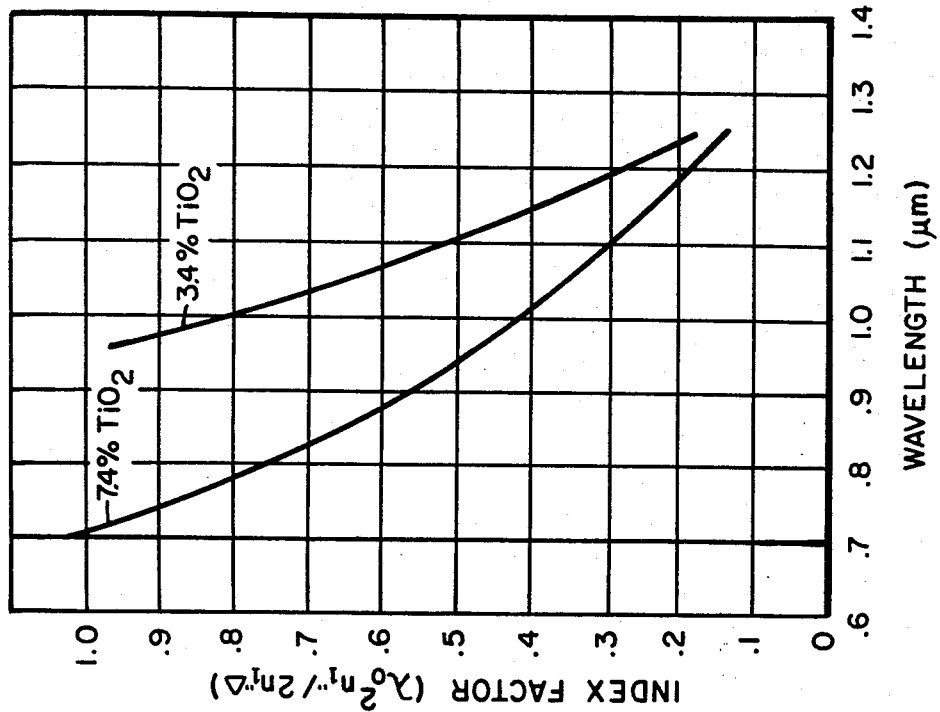
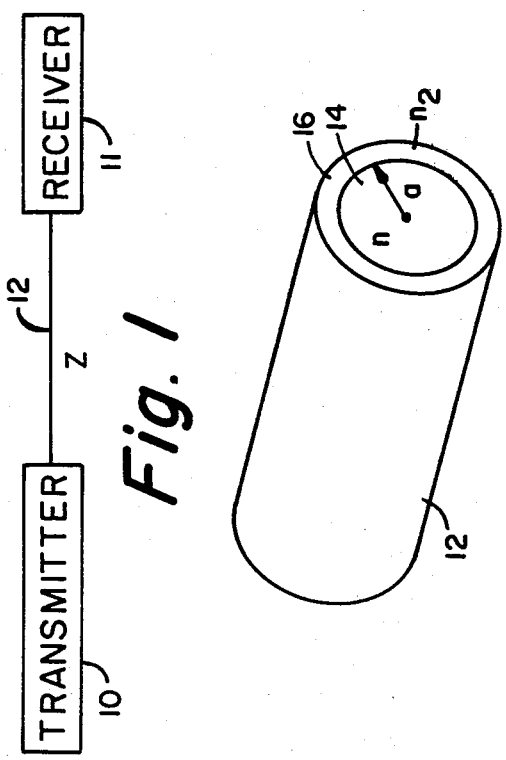
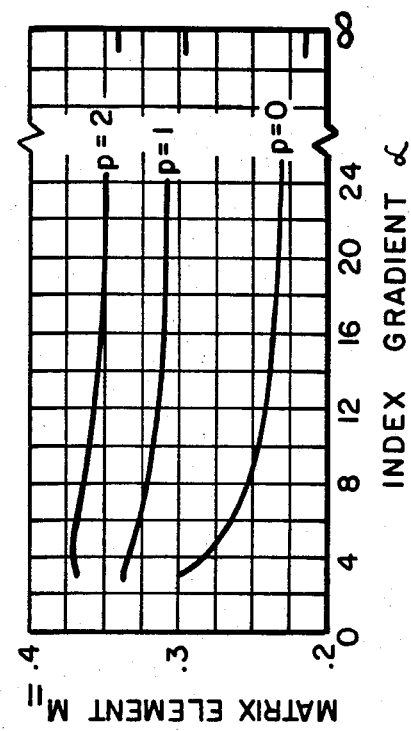

COMMUNICATION SYSTEM HAVING LOW DISPERSION GLASS OPTICAL WAVEGUIDE

BACKGROUND OF THE INVENTION

This invention relates to optical communication systems, and more particularly, to systems employing multimode optical waveguides for transmitting optical signals with low dispersion.

High capacity communication systems operating around $10^{15}$ Hz are needed to accommodate future increases in communication traffic. These systems are referred to as optical communication systems since $10^{15}$ Hz is within the frequency spectrum of light. Optical waveguides, which are the most promising medium for transmission at such frequencies, normally consist of an optical fiber having a transparent core surrounded by transparent cladding material having a refractive index which is lower than that of the core.

The propagation of light waves in optical waveguides is governed by laws of physics similar to those that govern microwave propagation and therefore can be studied in terms of modes, each of which has its own propagation and distribution characteristics. Single mode waveguides are advantageous in that they are capable of propagating optical signals with very low dispersion, but due to the low numerical aperture and small core size of such fibers, lasers must be employed to inject optical signals into these waveguides.

Multimode waveguides have larger core diameters and larger numerical apertures than single mode waveguides and are therefore often the preferred medium for the transmission of optical signals since they can accept light from incoherent, broad spectral width sources such as light emitting diodes. However, thousands of modes propagate in multimode waveguides, each mode traveling at a slightly different group velocity. A short input pulse that is shared by many guided modes thus splits up into a sequence of pulses that arrive at the output end of the waveguide at different times. This type of pulse dispersion is the dominant cause of dispersion in typical multimode waveguides. Pulse dispersion from wavelength dependent effects, viz. material dispersion and dispersion within each mode due to the wavelength dependence of the modal group velocity, are usually present to a lesser extent than the first mentioned cause of dispersion resulting from modal velocity differences.

As a result of mode coupling or the use of graded index profiles, or some combination of these two effects, pulse dispersion resulting from group velocity differences among modes can be reduced significantly so that the wavelength dependent effects become the dominant source of dispersion if sources with broad spectral widths, i.e., sources having widths greater than about 20A, are used.

Two different effects have previously been employed to reduce dispersion resulting from group velocity differences among modes. U.S. Pat. Nos. 3,666,348 and 3,687,514 teach methods of reducing dispersion in multi-mode waveguides by deliberately increasing mode conversion opportunities along the wave path such that the energy is forced to propagate in different modal configurations. The energy thus tends to arrive at the output more nearly at the same average time. In these two patents mode coupling is caused by introducing changes in such fiber parameters as core radius and/or changes in the direction of the fiber axis. Mode coupling can also be caused by external means such as jacketing, cabling or bundling the fiber to cause random distortions of the waveguide axis.

A second dispersion reducing effect, which is discussed in the publication by D. Gloge et al., entitled "Multimode Theory of Graded-Core Fibers", published in the November 1973 issue of the Bell System Technical Journal, pp. 1563–1578, employs a graded, continuous index profile that varies from a maximum value on-axis to a lower value at the fiber surface. The index distribution in this type of waveguide is given by the equations $$n(r) = n_1[1-2 \Delta(r/a)^\alpha]^{1/2} \text{ for } r<a \quad (1)$$

$$n(r) \simeq n_1[1-2\Delta]^{1/2} = n_2 \text{ for } r>a \quad (2)$$

where $n_1$ is the on-axis refractive index, $n_2$ is the cladding refractive index, $\Delta = (n_1-n_2)/n_1$, $a$ is the core radius and $\alpha$ is a parameter between 1 and $\infty$. As a result of mode coupling or the use of graded index profiles or some combination thereof, dispersion resulting from group velocity differences can be reduced sufficiently that the wavelength dependent effects, viz. material dispersion and dispersion within each mode due to the wavelength dependence of the modal group velocity, become the dominant source of dispersion if sources with broad spectral widths are used.

SUMMARY OF THE INVENTION

An object of the present invention is to provide an optical communication system having a minimum of wavelength dependent dispersion.

Briefly, the present invention relates to an optical communication system comprising a light source having a mean wavelength $\lambda_0$, a cylindrical, multimode, glass optical waveguide having an input end for receiving light from the source and an output end for radiating light to a detector. The waveguide comprises a core of radius $a$ surrounded by a layer of cladding material having a refractive index $n_2$, the on-axis refractive index $n_1$ of the core being greater than $n_2$. The index distribution in the core as a function of the radius $r$ is defined by equation 1 wherein $\alpha$ is a parameter between 1 and $\infty$ except that it cannot be equal to about 2. Means are provided for causing mode coupling in the waveguide. Means for provided for minimizing that dispersion produced by the finite spectral width of the source by utilizing the mode coupling to substantially cause cancellation of that dispersion which is linear with respect to waveguide length and which is caused by the mode independent material dispersion and by the mode dependent waveguide dispersion. As a result of this cancellation, the linear length dependence of that dispersion resulting from wavelength dependent effects is replaced by a square root of length dependence.

BRIEF DESCRIPTION OF THE DRAWINGS

FIG. 1 shows, in block diagram form, an optical communication system.

FIG. 2 shows a segment of the waveguide employed in FIG. 1.

FIG. 3 is a graph wherein the matrix element $M_{11}$ is plotted as a function of the index gradient $\alpha$ for three different values of curvature power spectra p.

FIG. 4 is a graph wherein the index factor ($\lambda_0 n_1''/2n_1\Delta$) is plotted as a function of wavelength for two different titania-doped silica glasses.

DETAILED DESCRIPTION

FIG. 1 shows in block diagram form a communication system comprising a transmitter 10, a receiver 11 and a glass optical waveguide fiber 12 of length z connecting the transmitter to the receiver. The present invention is most advantageously employed in those systems wherein the transmitter utilizes an optical source having a broad spectral width, but it is also applicable to those systems utilizing narrow band sources such as lasers.

In FIG. 2, waveguide 12 is illustrated as comprising a cylindrical core 14 of refractive index $n$ and radius $a$ surrounded by a layer 14 of cladding material of refractive index $n_2$. In accordance with the present invention, waveguide 12 may have a graded-type refractive index distribution wherein the refractive index $n$ varies in accordance with equations 1 and 2 for values of $\alpha$ other than $\infty$, or it may have a step-type refractive index distribution wherein equation 1 is evaluated for $\alpha = \infty$, and the refractive index of the core is $n_1$. The present invention does not apply to waveguides having an index gradient defined by equation 1 wherein $\alpha \simeq 2$, since it has been found that in such waveguides cancellation of wavelength dependent dispersion cannot be complete for that value of $\alpha$.

From equations 10 and 12 of the aforementioned Gloge publication, the equation for the propagation vector $\beta$ can be written $$\beta = n_1 k \left[ 1 - \Delta \left( \frac{m}{M(\alpha)} \right)^{\alpha/(\alpha+2)} \right] + 0(\Delta^2) \quad (3)$$

where $$M(\alpha) = \frac{\alpha}{\alpha+2} n_1^2 k^2 a^2 \Delta .$$

$k$ is the propagation constant in free space and is equal to $2\pi/\lambda_0$, and $m$ is the mode number.

The delay time per unit length $\tau$ is given by $$\tau = \frac{1}{c} \frac{d\beta}{dk} \quad (4)$$

which can be written as $$\tau = \frac{1}{c} N_1 \left[ 1 + \Delta \left( \frac{\alpha-2}{\alpha+2} \right) \left( \frac{m}{M} \right)^{\alpha/(\alpha+2)} \right] + \frac{1}{c} \left( \frac{2n_1}{\alpha+2} \right) \lambda_0 \Delta' \left( \frac{m}{M} \right)^{\alpha/(\alpha+2)} \quad (5)$$

where $$N_1 = \frac{d}{dk}(n_1 k) .$$

The primes and double primes represent, respectively, first and second derivatives with respect to $\lambda$. The wavelength dependence of $\tau$ is determined by the derivative $$\lambda_0 \frac{d\tau}{d\lambda} = -\lambda_0^2 n_1'' + 2n_1 \Delta C(\alpha) \left( \frac{m}{M} \right)^{\alpha/(\alpha+2)} \quad (6)$$

and $$C(\alpha) = \frac{\alpha-2}{\alpha+2} \cdot \frac{\alpha}{\alpha+2} + \frac{4\alpha}{(\alpha+2)^2} \cdot \frac{\lambda_0 \Delta'}{\Delta} + \frac{1}{\alpha+2} \cdot \frac{\lambda_0^2 \Delta''}{\Delta} \quad (7)$$

where $n_1, n_1', n_1''$, $\Delta'$ and $\Delta''$ are evaluated at the mean wavelength $\lambda_0$ of the source. In deriving equations 6 and 7 some small correction terms have been dropped.

The invention is motivated by the observation that in typical glasses $\lambda_0^2 n_1''$ is about equal to 0.02 so that for values of $\Delta$ about equal to $10^{-2}$ the two terms on the right hand side of equation 6 are of the same order of magnitude but of opposite sign. If mode coupling occurs, then the value of $(m/M)^{\alpha/(\alpha+2)}$ averaged over the steady state power distribution can be used in equation 6 to determine the average magnitude of the wavelength dependent effect. If $$\lambda_0^2 n_1'' = 2n_1 \Delta C(\alpha) \left[ \left( \frac{m}{M} \right)^{\alpha/(\alpha+2)} \right] \quad (8)$$

then the average value of $d\tau/d\lambda_0$ vanishes. Thus, waveguide 12 can be designed in such a manner that dispersion is significantly reduced.

To determine the exact form of the impulse response width, mode coupling theory must be used. To determine the rms pulse width taking into account the effect of the spectral distribution $S(\lambda)$ of the source, one follows the usual mode coupling analysis as discussed in D. Gloge, Bell System Technical Journal, Vol. 52, pp. 801–806, July–August. 1973 and in R. Olshansky, Proceedings of Microwave Research Institute International Symposium XXIII on Optical and Acoustical Electronics, 1974, using equation 5 as the delay time. The only difference in the analysis occurs in the calculation of the moments $\sigma_n(z)$ of the impulse response. To find these moments, the usual wavelength dependent moments $\sigma_n(z,\lambda)$ which are discussed in my article entitled "Mode Coupling Effects in Graded-Index Optical Fibers", Applied Optics, April 1975, Vol. 14, No. 4, pp. 935–945, must be integrated over all wavelengths using $S(\lambda)$ as a weighing function. This analysis shows that the dominant term of the rms pulse width is $$\sigma(z) = \frac{z\sigma}{c\lambda_0} [-\lambda_0^2 n_1'' + 2n_1 \Delta C(\alpha) M_{11}(\alpha)] + 0\left(\sqrt{z}\right) \quad (9)$$

provided that the length $z$ of waveguide 12 is long compared to the coupling length. The term $\sigma_\lambda$ is the rms spectral width of the source, and the matrix element $M_{11}(\alpha)$ represents the value of $(m/M)^{\alpha/(\alpha+2)}$ averaged over the steady state distribution. Its value will depend on the shape of the steady state distribution which in turn is determined by the perturbing power spectrum and the index profile. The value of $M_{11}(\alpha)$, which will be hereinafter discussed, can be expected to be in the range of $0.1 < M_{11}(\alpha) < 1.0$. It is apparent that the term in equation 9 which is linear in $z$ can be substantially eliminated by proper design of the waveguide. In accordance with the present invention, multimode waveguides having mode coupling are designed such that the quantity $$-\lambda_o^2 n_1'' + 2n_1 \Delta C(\alpha) M_{11}(\alpha) \qquad (10)$$

is substantially reduced to zero. This can be accomplished by several alternative methods: by choosing core and cladding materials having the proper refractive indices to provide the desired values of $\Delta$ and $n_1''$; by selecting a specific type of perturbation for causing mode coupling, a desired value of $M_{11}(\alpha)$ can be obtained; or by varying the quantity $\lambda_o^2 n''$ by selection of the mean wavelength $\lambda_0$ of the source.

The matrix element $M_{11}$ plays an important role in the design of an optical waveguide with dispersion cancellation. Therefore, the definition of $M_{11}$, its theoretical calculation, and a method of measuring it directly is discussed hereinbelow. Basically, $M_{11}$ is an integral over the mode spectrum of the square of the steady state distribution of optical power. It has been defined for a step index waveguide in the publication "Theory of Dielectric Optical Waveguides" by D. Marcuse, Academic Press, New York, 1974, p. 236.

For the class of index profiles given by equation 1, the M guided modes separate into $\sqrt{M}$ levels, with the mth level containing 2m modes with nearly equal propagation vectors. If one defines $$x^2 = m/M \qquad (11)$$

then the delay time for the index profiles given by equation 1 can be written as $$\tau(x) = \frac{N_1}{c}\left[1 + \Delta\left(\frac{\alpha-2}{\alpha+2}\right)x^{2\alpha/(\alpha+2)}\right] + \frac{1}{c}\frac{2n_1}{\alpha+2}\lambda\Delta'(x)^{2\alpha/(\alpha+2)} + 0(\Delta^2) \qquad (12)$$

where $x$ can be regarded as a continuous variable labelling the different mode levels.

As a result of mode coupling, the power in the waveguide is described in terms of eigen-distributions $P_j(x)$ which are orthonormal, $$\int_0^1 x P_j(x) P_k(x) dx = \delta_{jk} \qquad (13)$$

$P_j(x)$ represents the average power per mode in level $x$ for the jth power distribution. $M_{11}$ is then defined by $$M_{11} = \int_0^1 x(x)^{2\alpha/(\alpha+2)} [P_1(x)]^2 dx \qquad (14)$$

$P_1(x)$ is the steady-state power distribution and the factor $(x)^{2\alpha/(\alpha+2)}$ comes from the mode dependence of the delay time given by equation 12.

The actual numerical value of $M_{11}$ depends on the index gradient $\alpha$ and on the nature of the perturbation causing mode coupling. For random bend type perturbations characterized by curvature power spectra $p = 0$, 1 or 2, $M_{11}$ has been calculated from the theory of mode coupling as developed in my aforementioned article published in the Proceedings of Microwave Research Institute International Symposium XXIII on Optical and Acoustical Electronics. The results are shown in FIG. 3.

The matrix element $M_{11}$ can also be measured directly. In the presence of mode coupling the arrival time of a pulse is given by $$\tau(z) = \frac{N_1}{c}\left[1 + \Delta\left(\frac{\alpha-2}{\alpha+2}\right)M_{11}\right]z + \frac{1}{c}\frac{2n_1}{\alpha+2}\lambda\Delta' M_{11}z + 0(z^0) + 0(\Delta^2) \qquad (15)$$

If $\alpha$, $\Delta$, $N_1$ and $\lambda\Delta'$ are known, then a measurement of the differential delay time of the impulse response can be used in conjunction with equation 15 to determine $M_{11}$.

The following examples illustrate the manner in which an optical communication system can be designed in accordance with the present invention to obtain minimum pulse dispersion. Although single waveguide fibers will be discussed in these examples, it is to be understood that bundles or cables of such fibers may be employed.

The mean source wavelengths are to be determined for two different optical waveguides of known characteristics. Both waveguides are of the step-index type and have a curvature power spectrum of $p=2$. Furthermore, both waveguides have pure fused silica cladding, the first having a core of fused silica ($SiO_2$) doped with 7.4 wt.% $TiO_2$ and the second having a core of fused silica doped with 3.4 wt.% $TiO_2$.

It is known that $\alpha = \infty$ for a step index waveguide. Setting the quantity designated as equation 9 equal to zero and evaluating for $\alpha = \infty$, the following equation is obtained $$-\lambda_o^2 n_1'' + 2n_1 \Delta M_{11}(\infty) = 0 \qquad (16)$$

Equation 16 indicates that cancellation of the two types of wavelength dependent dispersion that are linear in $z$ occurs and thus minimum pulse dispersion is obtained if $$M_{11}(\infty) = \frac{\lambda_o^2 n_1''}{2n_1\Delta} \qquad (17)$$

The factor on the right side of equation 17, which is referred to herein as the index factor, has been plotted in FIG. 4 as a function of wavelength. The quantities $\lambda_o^2 n_1''$, and $\Delta$ have been determined for the two titania waveguides by making a Sellmeier fit to refractive index measurements of bulk samples of $TiO_2$ doped $SiO_2$ at different wavelengths and from a published Sellmeier fit for the refractive index values of $SiO_2$ at different wavelengths.

From FIG. 3, the value of $M_{11}(\alpha)$ is found to be 0.34 for $p = 2$ and $\alpha = \infty$. Equation 17 indicates that the index factor, which is plotted in the graph of FIG. 4 as a function of wavelength, must also be 0.34. Referring to FIG. 4, it can be seen that an index factor of 0.34 corresponds to a mean source wavelength of $1.07\mu m$ for the waveguide having a core of $SiO_2$ doped with 7.4 wt.% $TiO_2$ and to a mean source wavelength of $1.17\mu m$ for the waveguide having a core of $SiO_2$ doped with 3.4 wt.% $TiO_2$.

As a further illustration of the invention the mean source wavelengths are determined for two waveguides having graded refractive index profiles given by equations 1 and 2 wherein $\alpha = 16$. As in the previous example both waveguides have fused silica cladding, the first having a core of fused silica with a maximum dopant level of 7.4 wt.% $TiO_2$ at the center and the second having a maximum dopant level of 3.4 wt.% $TiO_2$ at the center. Also, the power spectrum $p$ of both waveguides is assumed to be equal to 2.

In accordance with the present invention the source wavelength should be selected so that equation 10 is substantially equal to zero. For a value of equal to 16, this implies $$-\lambda_0^2 n_1'' + 2n_1\Delta\, C(16)M_{11}(16) = 0 \quad (18)$$

where $$C(16) = \frac{56}{81} + \frac{16}{81}\frac{\lambda\Delta'}{\Delta} + \frac{1}{18}\frac{\lambda^2\Delta''}{\Delta} \quad (19)$$

From the Sellmeier fits for the refractive indices of the relevant waveguide compositions, it can be found that in the wavelength range around $1.1\lambda m$ and $1.2\lambda m$, $\lambda\Delta'/\Delta \approx -.12$ and $\lambda^2\Delta''/\Delta \approx .08$. From equation 19 $C(16)$ can be determined to be about 0.67.

Since the perturbation has a power spectrum given by $p = 2$, the graph of FIG. 3 indicates that a waveguide having an index gradient $\alpha$ equal to 16 corresponds to a value of $M_{11}$ equal to 0.36. To obtain cancellation of the two types of dispersion equation 18 reveals that the index factor $\lambda_0^2 n_1''/2n_1\Delta$ should be chosen to be the product of $C(16)$ and $M_{11}(16)$, which is 0.24. FIG. 4 shows that this can be achieved in the case of the waveguide with the 7.4 wt.% $TiO_2$ doped core by having a mean source wavelength $\lambda_0$ of $1.15\mu m$, and it can be achieved in the case of the waveguide with the 3.4 wt.% $TiO_2$ doped core by having a mean source wavelength $\lambda_0$ of $1.22\mu m$.

I claim:

1. An optical communication system comprising a light source having a mean wavelength $\lambda_o$, a cylindrical, multimode, optical waveguide having input and output ends, said input end being disposed in light receiving relationship with respect to said source, said waveguide having a core of radius a surrounded by a layer of cladding material having a refractive index $n_2$, the on-axis refractive index $n_1$ of said core being greater than $n_2$, and the index distribution in said core as a function of the radius $r$ being defined by the equation $$n(r) = n_1[1-2\Delta(r/a)^\alpha]^{1/2} \text{ for } r<a$$

where $\Delta = (n_1-n_2)/n_1$ and $\alpha$ is a parameter between 1 and infinity, but not equal to about 2, means for causing mode coupling in said waveguide, said mode coupling means, said mean source wavelength and said optical waveguide being such that the quantity $\lambda_0^2 n_1''$, which determines the mode independent material dispersion that is dependent upon the spectral width of said source, is substantially equal to the quantity $2n_1\Delta C(\infty)M_{11}(\infty)$, which determines the mode dependent waveguide dispersion that is dependent upon the spectral width of said source, where $$C(\alpha) = \frac{\alpha-2}{\alpha+2}\frac{\alpha}{\alpha+2} + \frac{4\alpha}{(\alpha+2)^2}\frac{\lambda 0\Delta'}{\Delta} + \frac{1}{\alpha+2}\frac{\lambda 0\Delta''}{\Delta}^2$$

and wherein the matrix element $M_{11}$ is a number between 0.1 and 1.0, depending upon the index gradient $\alpha$ and the nature of the perturbation caused by said mode coupling means, and means for detecting light radiating from the output end of said waveguide.

2. An optical communication system in accordance with claim 1 wherein said waveguide is of the step-index type wherein $\alpha$ is equal to infinity and the parameters of said waveguide are such that the quantity $$-\lambda_0^2 n_1'' + 2n_1\Delta M_{11}(\infty)$$

is substantially equal to zero.

3. An optical communication system in accordance with claim 1 wherein the spectral width of said light source is greater than 20Å.

4. An optical communication system in accordance with claim 1 wherein said optical waveguide has a step-shaped refractive index curve.

* * * * *

UNITED STATES PATENT AND TRADEMARK OFFICE
CERTIFICATE OF CORRECTION

PATENT NO. : 4,006,962
DATED : February 8, 1977
INVENTOR(S) : Robert Olshansky

It is certified that error appears in the above—identified patent and that said Letters Patent are hereby corrected as shown below:

Column 8, line 25, "$2n_1 \Delta C(\infty) M_{11}(\infty)$" should be -- $2n_1 \Delta C(\alpha) M_{11}(\alpha)$ --.

Signed and Sealed this

Seventh Day of November 1978

[SEAL]

Attest:

RUTH C. MASON
*Attesting Officer*

DONALD W. BANNER
*Commissioner of Patents and Trademarks*